(12) United States Patent
Yao

(10) Patent No.: US 11,872,544 B2
(45) Date of Patent: Jan. 16, 2024

(54) MODIFIED ZSM-5 CATALYST FOR CONVERTING LIGHT HYDROCARBONS TO LIQUID FUELS

(71) Applicant: PHILLIPS 66 COMPANY, Houston, TX (US)

(72) Inventor: Jianhua Yao, Bartlesville, OK (US)

(73) Assignee: PHILLIPS 66 COMPANY, Houston, TX (US)

( * ) Notice: Subject to any disclaimer, the term of this patent is extended or adjusted under 35 U.S.C. 154(b) by 162 days.

(21) Appl. No.: 17/450,354

(22) Filed: Oct. 8, 2021

(65) Prior Publication Data

US 2022/0111368 A1 Apr. 14, 2022

Related U.S. Application Data

(60) Provisional application No. 63/115,709, filed on Nov. 19, 2020, provisional application No. 63/089,343, filed on Oct. 8, 2020.

(51) Int. Cl.
*B01J 29/40* (2006.01)
*B01J 37/04* (2006.01)
(Continued)

(52) U.S. Cl.
CPC ............. *B01J 29/40* (2013.01); *B01J 35/002* (2013.01); *B01J 35/1057* (2013.01);
(Continued)

(58) Field of Classification Search
CPC ...... B01J 29/40; B01J 35/002; B01J 35/1057; B01J 35/1061; B01J 37/0009; B01J 37/04; B01J 37/082; B01J 37/30; B01J 2229/22; B01J 2229/37; B01J 2229/38; B01J 2229/42; C10G 50/00; C10G 65/02; C10G 2300/4006; C10G 2300/4012;
(Continued)

(56) References Cited

U.S. PATENT DOCUMENTS

| | | | | |
|---|---|---|---|---|
| 4,851,605 A | * | 7/1989 | Bortinger | ................ C01B 39/40 423/DIG. 22 |
| 5,624,658 A | * | 4/1997 | Fitoussi | ................. C01B 39/40 423/DIG. 22 |

(Continued)

FOREIGN PATENT DOCUMENTS

CN 107737606 2/2018

OTHER PUBLICATIONS

PCT Notification of Transmittal of the International Search Report and the Written Opinion of the International Searching Authority, or the Declaration, International Filing Date Oct. 8, 2021, International Application No. PCT/US2021/054203, 30 pages.

*Primary Examiner* — Ali Z Fadhel
(74) *Attorney, Agent, or Firm* — McDonnell Boehnen Hulbert & Berghoff LLP

(57) ABSTRACT

Methods for modifying a ZSM-5 zeolite by contacting the zeolite with an alkaline solution prior to combining with a binder material to produce a modified ZSM-5 catalyst extrudate that has substantially longer catalyst life, relative to an untreated ZSM-5 catalyst, for converting light olefins to products that may be used as a liquid transportation fuel blend stock. The alkaline solution is optionally sodium hydroxide. The binder is optionally alumina, bentonite or silica.

31 Claims, 5 Drawing Sheets

(51) Int. Cl.
*B01J 37/08* (2006.01)
*B01J 37/30* (2006.01)
*B01J 35/10* (2006.01)
*B01J 35/00* (2006.01)
*C10G 50/00* (2006.01)
*C10G 65/02* (2006.01)
*C10L 1/04* (2006.01)
*B01J 37/00* (2006.01)

(52) U.S. Cl.
CPC ....... *B01J 35/1061* (2013.01); *B01J 37/0009* (2013.01); *B01J 37/04* (2013.01); *B01J 37/082* (2013.01); *B01J 37/30* (2013.01); *C10G 50/00* (2013.01); *C10G 65/02* (2013.01); *C10L 1/04* (2013.01); C10G 2300/4006 (2013.01); C10G 2300/4012 (2013.01); C10G 2300/4018 (2013.01); C10G 2300/70 (2013.01); C10G 2400/02 (2013.01)

(58) Field of Classification Search
CPC ........ C10G 2300/4018; C10G 2300/70; C10G 2400/02; C10G 57/02; C10G 69/126; C10L 1/04
See application file for complete search history.

(56) References Cited

U.S. PATENT DOCUMENTS

| | | | |
|---|---|---|---|
| 5,827,422 A * | 10/1998 | Drake | C10G 11/05 585/407 |
| 8,685,875 B2 * | 4/2014 | Garcia-Martinez | B01J 29/08 502/79 |
| 2011/0118107 A1 * | 5/2011 | Garcia-Martinez | B01J 29/08 502/79 |
| 2016/0002061 A1 | 1/2016 | Bao et al. | |
| 2017/0354961 A1 * | 12/2017 | Podsiadlo | B01J 31/26 |
| 2018/0022664 A1 * | 1/2018 | Yao | C01B 39/38 585/510 |
| 2019/0225499 A1 | 7/2019 | Petrik et al. | |
| 2019/0232261 A1 * | 8/2019 | Yanson | B01J 29/48 |

* cited by examiner

MODIFIED ZSM-5 CATALYST FOR CONVERTING LIGHT HYDROCARBONS TO LIQUID FUELS

CROSS-REFERENCE TO RELATED APPLICATIONS

This application is a non-provisional application which claims the benefit of and priority to U.S. Provisional Application Ser. No. 63/089,343 filed Oct. 8, 2020 entitled "Modified ZSM-5 Catalyst for Converting Light Hydrocarbons to Liquid Fuels" and U.S. Provisional Application Ser. No. 63/115,709 filed Nov. 19, 2020 entitled "Modified ZSM-5 Catalyst for Converting Light Hydrocarbons to Liquid Fuels" both of which are hereby incorporated by reference in its entirety.

STATEMENT REGARDING FEDERALLY SPONSORED RESEARCH OR DEVELOPMENT

None.

FIELD OF THE INVENTION

This invention relates to a modified ZSM-5 catalyst for converting light alkanes to liquid transportation fuels, processes for making the modified ZSM-5 catalyst and processes that utilize the modified ZSM-5 catalyst for converting light alkanes to liquid transportation fuels.

BACKGROUND

Over the past decade, production of natural gas liquids (NGLs) in the United States has dramatically increased in conjunction with the increased use of hydraulic fracturing (fracking) technology to improve crude oil recovery from shale formations. Ethane is the lightest member of the NGL family and makes up ca. 40% of a typical NGL mixture. Along with other NGLs, the growth in production of ethane has outpaced demand, leading to a steep price drop in ethane, from $40/BBBL in 2011 to $7/BBL in 2016.

As a result, ethane has re-emerged as a profitable target for upgrading to liquid transportation fuels, such as gasoline and/or diesel. There are numerous processes and catalysts available that can convert ethane to gasoline and or diesel, yet none have been commercialized, in large part due to problems with coking of upgrading catalysts that significantly reduces catalyst lifespan and makes such processes non-profitable. Finding a commercially viable process that can convert ethane to liquid transportation fuels could provide a competitive advantage by utilizing an advantaged feed stock.

BRIEF SUMMARY

A method for producing a modified ZSM-5 catalyst, comprising: a) contacting an NaZSM-5 zeolite that is free of binder material and template with an alkaline solution characterized by a pH of at least 11 for at least 1 hr to produce a modified Na-ZSM-5 zeolite; b) diluting the alkaline solution with water, then performing ion-exchange on the modified NaZSM-5 zeolite by contacting the modified NaZSM-5 zeolite with an acidic solution characterized by a pH in the range from 1.0 to 6.5 to convert the modified NaZSM-5 zeolite to a modified HZSM-5 catalyst intermediate; c) drying the modified HZSM-5 catalyst intermediate to produce a dried H-ZSM-5 catalyst intermediate; d) calcining the dried HZSM-5 catalyst intermediate to produce a modified HZSM-5 catalyst.

Some embodiments of the method for producing further comprise combining the modified HZSM-5 catalyst with at least one binder material to produce a modified HZSM-5 catalyst extrudate. In some embodiments, the alkaline solution comprises a sodium hydroxide solution at a concentration in the range from 20 mM to 200 mM, alternatively at a concentration in the range from 50 mM to 150 mM. In some embodiments, the alkaline solution is maintained at a temperature of at least 35 deg F. during the contacting of part a).

In some embodiments, the acidic solution is maintained at a temperature of at least 50 deg F. and the ion-exchange is performed for at least 1 hr. In some embodiments, the acidic solution comprises an aqueous ammonium nitrate solution at a concentration in the range from 100 mM to 5 M. In some embodiments, the drying occurs at a temperature of at least 100° C. and the calcining occurs at a temperature of at least 500° C.

Some embodiments comprise a method for converting ethylene to larger hydrocarbons, comprising: a) producing a modified HZSM-5 catalyst extrudate according to the methods described above; b) contacting a feed stream comprising ethylene with the modified HZSM-5 catalyst extrudate at a pressure between 0 psig and 800 psig, a temperature in the range from 260° C. to 420° C., and a gas hourly space velocity of between 1000 and 5000 inverse hours to convert at least 85% of the ethylene to products that are characterized as blend stock for a liquid transportation fuel.

In some embodiments of the process for converting, the feed stream comprises a light olefin feed stream predominantly comprising olefins containing 2-3 carbon atoms and alkanes containing 2-3 carbon atoms.

In some embodiments of the process for converting, the feed stream is derived from the cracking of light alkanes containing from two to seven carbon atoms, where the cracking is selected from thermal cracking and catalytic cracking.

Some embodiments of the process for converting additionally comprise hydrotreating the products of b) to produce the blend stock for a liquid transportation fuel.

The present disclosure also describes a modified HZSM-5 catalyst produced according to the method of claim 1, where the contacting with an alkaline solution removes at least a portion of the crystal structure from a ZSM-5 zeolite to produce a modified HZSM-5 zeolite comprising an increased mesopore volume, wherein mesopores are defined as 2-50 nm in diameter.

In some embodiments, the modified HZSM-5 catalyst further comprises a mixture of the modified HZSM-5 catalyst with at least one binder material to produce a modified HZSM-5 catalyst extrudate that is characterized by an increase in at least one of crush resistance, attrition resistance and mechanical strength relative to an HZSM-5 catalyst extrudate comprising the same binder material that has been contacted with an acidic solution comprising hydrogen chloride at a concentration of at least 4 M for at least 4 hours.

In some embodiments of the modified HZSM-5 catalyst produced by the inventive method disclosed above, the alkaline solution used in the method comprises sodium hydroxide solution at a concentration in the range from 1 mM to 200 mM, alternatively, in the range from 50 mM to 150 mM Some embodiments comprise a modified HZSM-5 catalyst produced according to the inventive process disclosed above, where the alkaline solution is maintained at a temperature in the range from 25° C. to 50° C. during the contacting of part a) and optionally, the contacting occurs for at least 3 hrs.

Some embodiments comprise a modified HZSM-5 catalyst produced by the inventive method disclosed above, where the acidic solution comprises an aqueous ammonium nitrate solution at a concentration in the range from 100 mM to 5 M. Optionally, the acidic solution is maintained at a temperature of 80° C., and the ion-exchange is performed for at least 1 hr.

Some embodiments comprise a modified HZSM-5 catalyst produced by the inventive method disclosed above, where the drying occurs at a temperature of at least 100° C. and the calcining occurs at a temperature of at least 500° C.

BRIEF DESCRIPTION OF THE DRAWINGS

A more complete understanding of the present inventive processes, systems and item of manufacture may be obtained by referring to description provided below in conjunction with the accompanying drawings, wherein.

DETAILED DESCRIPTION

Figure 1:
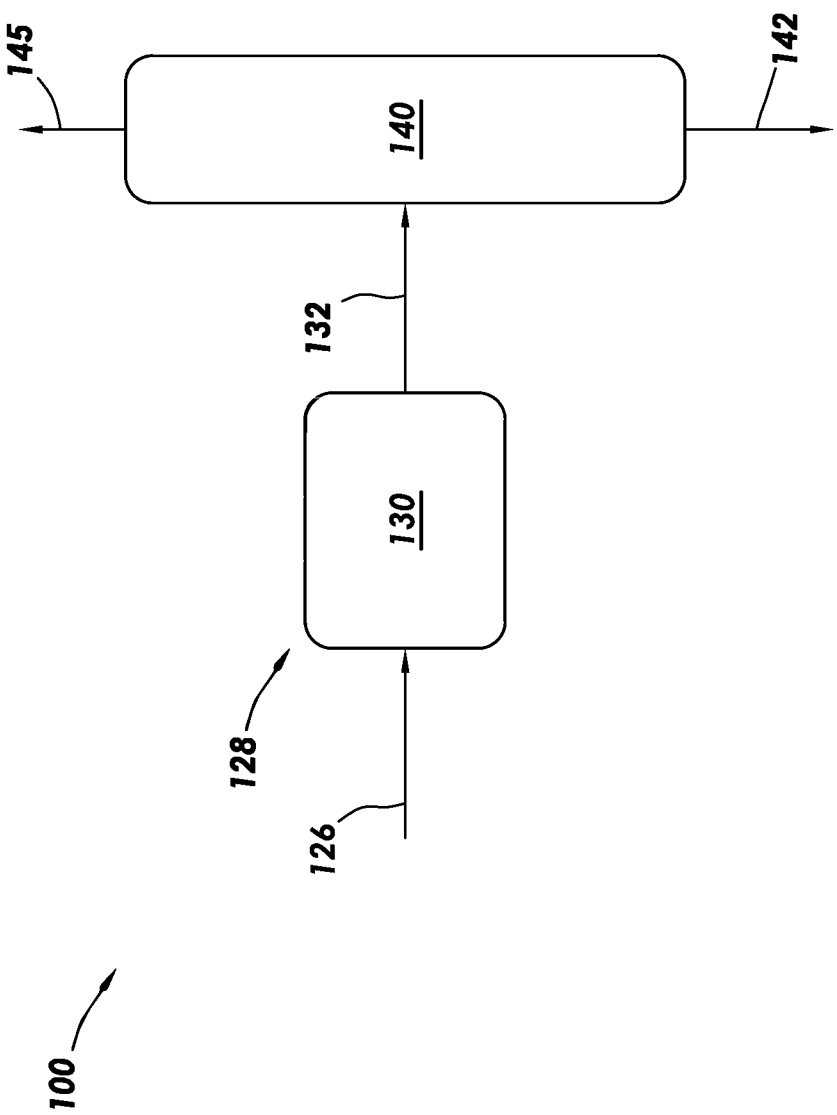
FIG. 1 is a schematic drawing illustrating a second embodiment of the inventive process.

Many catalysts are known to facilitate the catalytic process of oligomerizing ethylene. Yet, the useful lifespan of these catalysts is extremely short and can be measured in hours, which to date has made a commercial process to upgrade ethane to liquid transportation fuels cost-prohibitive. While a variety of ZSM-5 catalysts are commercially available, the productivity and resistance to coking of these catalysts varies substantially. The basic formulation and sieve structure of these ZSM-5 catalysts remains fairly constant, yet the zeolite crystallite size, the catalyst particle size and the sizes of the micropores and mesopores varies substantially. While not wishing to be bound by theory, it is believed that the process of forming coke on a zeolite catalyst is actually a multistep reaction process that results from inability of initial oligomerization products to migrate out of the micropores of the zeolite catalyst before further reacting to form coke. The process begins with oligomerization of light olefins that sometimes proceeds to cyclization, then to polynuclear cyclization and then finally to coke that deposits in the pores of the catalyst.

Increasing catalyst lifespan by post-synthesis treatment of zeolite catalyst extrudates with alkaline and/or acidic solutions has previously been described in U.S. Pat. Nos. 10,207, 962, 10,214,462 and 10,214,426. These processes include treating a finished zeolite catalyst extrudate (where the finished catalyst is combined with an alumina binder in a catalyst pellet) with a base, an acid, or both a base and an acid in series. Such processes have been shown to improve the catalytic lifespan of the catalyst on stream (i.e., before catalytic activity is significantly decreased due to coking). Unfortunately, the present inventors discovered that the resulting treated catalyst is characterized by a decreased mechanical strength, or crush resistance (as is typically measured by processes ASTM D4179, ASTM D6175-03, and/or ASTM D7084-04). This may adversely affect the lifespan of the modified catalyst when used in commercial setting. In addition, subjecting a catalyst extrudate to base and/or acid treatment requires additional catalyst preparation steps as opposed to treating the catalyst powder prior to combining the catalyst powder with a catalyst binder or support.

Certain embodiments disclosed herein relate to processes for making a modified catalyst that is characterized by improved crush strength and increased resistance to coking by treating a ZSM-5 zeolite powder with an alkaline solution prior to combining the zeolite with a binder to produce a final catalyst extrudate. The process of making requires fewer steps than conventional catalyst treatment processes and also produces a modified catalyst characterized by improved mechanical strength and catalytic half-life (for converting light olefins to larger hydrocarbons).

Certain embodiments relate to a modified catalyst that is characterized by improved crush strength and increased resistance to coking, allowing the modified catalyst to be utilized to catalytically upgrade light olefins to larger hydrocarbons for longer periods of time on stream before regenerating the catalyst (to remove coke) is needed.

Certain embodiments disclosed herein relate to catalytic upgrading process that utilizes the modified catalyst to upgrade a light hydrocarbons stream comprising at least one of ethane, propane and mixtures thereof to produce larger hydrocarbons that are characterized as having a boiling point in the range of a liquid transportation fuel. In certain embodiments, the light hydrocarbons stream comprises an ethane stream comprising at least 80 mol % ethane. Certain embodiments comprise a catalytic upgrading process that utilizes the modified catalyst to a light hydrocarbons stream that comprises C2-C7 alkanes (commonly referred to as Y-grade). In certain embodiments, the light hydrocarbons stream comprises at least 80 mol % C2-C7 alkanes.

In certain embodiments, the light hydrocarbons stream comprises one of either catalytic activation or thermal cracking of the light hydrocarbons stream to produce an intermediate stream, followed by catalytic upgrading of the intermediate stream using the inventive catalyst.

There are multiple apparent advantages of the present inventive method to produce a modified catalyst, the modified catalyst produced by the method, and the process for catalytically converting light hydrocarbons to products characterized as a liquid transportation fuel (or a blend stock thereof) using the modified catalyst. Other advantages may also be present that are not enumerated here.

Among the many advantages, the present inventive method that produces a modified catalyst requires only one ion-exchange procedure in the overall catalyst preparation. In addition, the present inventive method to produce a modified catalyst does not require contacting the catalyst with concentrated (e.g., 4M) hydrochloric acid to produce a modified catalyst. Thus, the present inventive method requires significantly fewer overall steps to modify the catalyst, while still producing a modified ZSM-5 catalyst that is characterized as having nearly identical (i.e., comparable, similar) resistance to coking relative to a catalyst described in U.S. Pat. No. 10,214,426 that was treated by both an alkaline solution and an acidic solution in series configuration.

The resistance to coking of the modified ZSM-5 catalyst produced by the present inventive method allows the modified catalyst to be utilized for a longer period of time on-stream (relative to an untreated ZSM-5 catalyst) catalytically converting light olefins before accumulation of coke on the catalyst causes catalytic activity to drop by 10%. This was defined as the time on-stream until 90% of original conversion rate was reached (TOS90).

Among the many advantages, the modified ZSM-5 catalyst produced by the methods disclosed herein has an increased mechanical strength or crush resistance as determined by at least one of ASTM D4179, ASTM D6175-03, and/or ASTM D7084-04 relative to a ZSM-5 catalyst modified according to the procedures described in U.S. Pat. No. 10,214,426, where a ZSM-5 catalyst is combined with an alumina binder material to produce a final catalyst extrudate prior to treating the catalyst with an alkaline and/or acidic solution. While not wishing to be bound by theory, evidence suggests that concentrated acidic solution etches away a significant percentage of the alumina binder material, which contributes to a modified catalyst characterized by decreased mechanical strength or crush resistance.

Certain embodiments comprise a process for converting ethane to liquid fuels using the inventive modified catalyst. FIG. 1 is a schematic diagram illustrating an ethane conversion process 100 that converts light olefins to products that meet government specifications for blend stock of at least one liquid transportation fuel.

In a first embodiment illustrated by the flow diagram of FIG. 1, a light olefin stream 126 is fed into an oligomerization reactor 128 containing an oligomerization catalyst 130 that is a modified ZSM-5 catalyst produced by the methods described herein. Light olefin stream 126 contacts the oligomerization catalyst 130 at a temperature and pressure that facilitate conversion of the light olefin stream 126 to produce an oligomerization effluent 132 that exits the oligomerization reactor 128 and is conveyed to a second separator 140 that is maintained at a temperature that allows the selective condensation of hydrocarbons comprising at least five carbon atoms to produce a condensed liquid hydrocarbons 142 comprising hydrocarbons containing at least five carbon atoms that exits the second separator 140 via a first outlet. Condensed liquid hydrocarbons 142 may be further fractionated by the second separator into a gasoline blending fraction and a diesel blending fraction, respectively.

The second separator additionally produces a light hydrocarbon stream 145 that remains in vapor-phase and comprises hydrocarbons containing four or less carbon atoms that may be utilized in a refinery process that is outside the scope of this disclosure.

Figure 2:
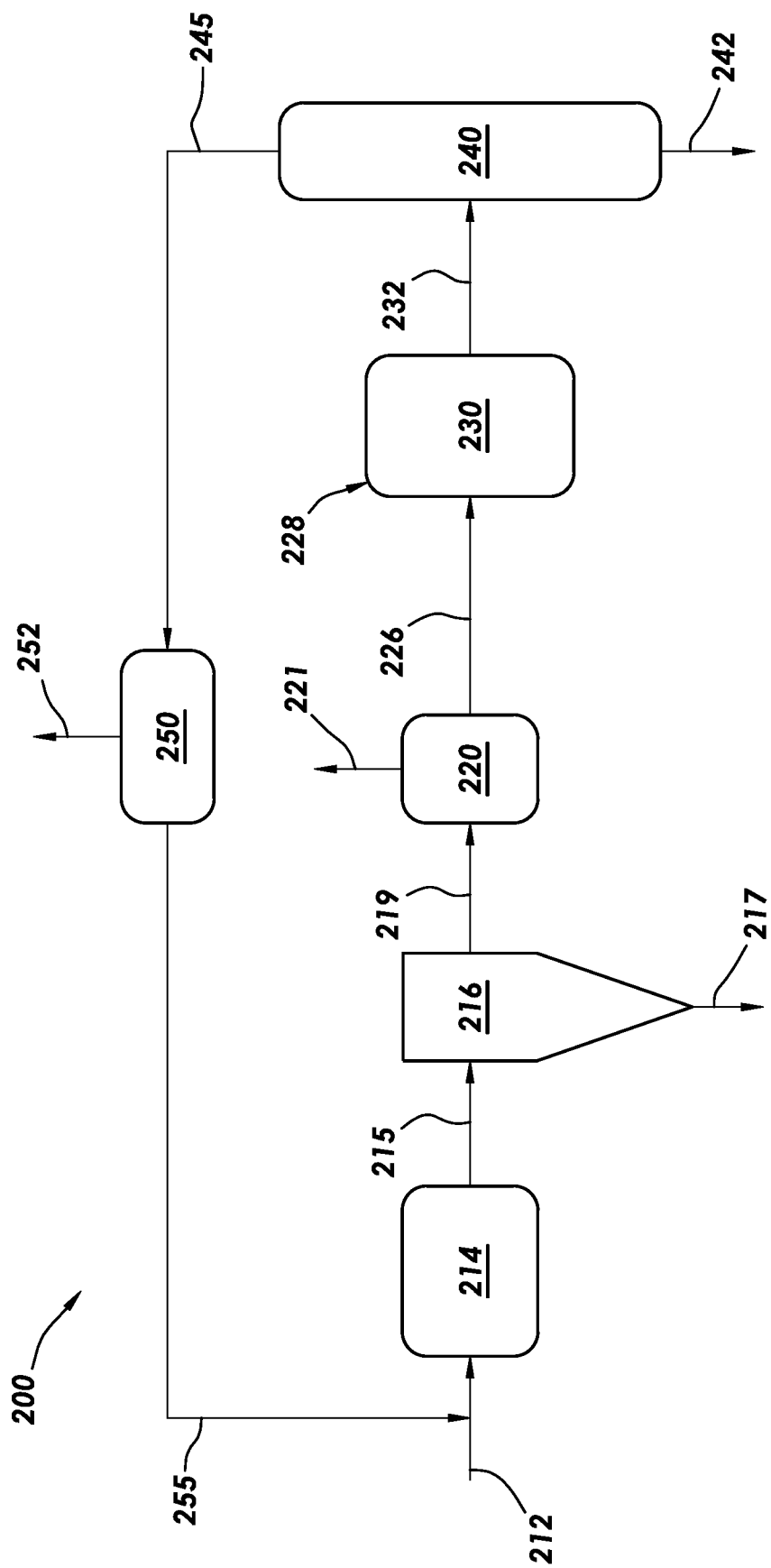
FIG. 2 is a schematic drawing illustrating a second embodiment of the inventive process.

Certain embodiments additionally comprise cracking a light alkane stream to produce the light olefins stream that is then contacted with the modified ZSM-5 catalyst described herein, as illustrated by the flow diagram of FIG. 2. The cracking may comprise a catalytic cracking process or a thermal cracking process. For embodiments that comprise thermal cracking, a light alkane stream 212 may optionally comprise any C2-C7 alkane, or combinations thereof. In the embodiment shown in FIG. 2, the light alkane stream 212 is fed directly into cracking unit 214 where thermal energy cracks the light alkane stream 212 at low pressure (near atmospheric pressure with optional steam injection) and high temperature (approximately 500° C. to 1000° C.) to form a raw light olefins stream 215 comprising predominantly hydrogen, methane, acetylene, ethylene, ethane, propylene, propane, butadiene, butenes, butanes, and a small amount of C5+ hydrocarbons. Thermally cracking of light olefins is conventional, and thus will not be discussed further here.

Alternatively, the cracking process conducted in cracking unit 214 may comprise a conventional catalyzed cracking process that contacts the light alkane stream 212 with at least one zeolite (or any other cracking catalyst) to facilitate the cracking of the ethane stream to produce the raw light olefins stream 215, which comprises olefin products that are suitable for upgrading to longer chain hydrocarbons catalyzed by an oligomerization catalyst. Such methods are well-understood in the field and therefore will not be discussed further here.

The raw light olefins stream 215 is received by a quench tower 216. Quench tower 216 is operable to thermally quench the raw light olefins stream 215 and prevent further cracking reactions. The quench tower 216 is operable to cool the cracked ethane stream and to produce a liquid product fraction 217 that is removed by force of gravity proximal to the bottom of the quench tower 216 and a light gases fraction 219 comprising C2-C5 gaseous hydrocarbons and some hydrogen that exits proximal to the top of the quench tower 216. The liquid product fraction 217 comprises hydrocarbons in the boiling point range of a liquid transportation fuel that may be used as gasoline blend stock. However, the light gases fraction 219 comprises ethylene along with hydrogen, methane, propylene, acetylene, unconverted ethane and propane, acid gases, and other residual gaseous products. Optionally, hydrogen is separated from the light gases fraction 219 in a first separator 220 to produce a hydrogen stream 221, and a light olefin stream 226 that comprises methane, propylene, acetylene, unconverted ethane and propane, acid gases, and other residual gaseous products.

The light olefin stream 226 is fed into an oligomerization reactor 228 containing an oligomerization catalyst 230 that is a modified ZSM-5 catalyst produced by the methods described herein. Light olefin stream 226 contacts the oligomerization catalyst 230 at a temperature and pressure that facilitate conversion of the light olefin stream 226 to produce an oligomerization effluent 232 that exits the oligomerization reactor 228 and is conveyed to a second separator 240 that is maintained at a temperature that selectively condenses hydrocarbons comprising at least five carbon atoms to produce a condensed liquid hydrocarbons 242 comprising hydrocarbons containing at least five carbon atoms that exits the second separator 240 via a first outlet. Optionally, condensed liquid hydrocarbons 242 may be further fractionated by the separator into a gasoline blending fraction and a diesel blending fraction, respectively (not depicted).

The second separator additionally produces a light hydrocarbon stream 245 that remains in vapor-phase and comprises hydrocarbons containing four or less carbon atoms. Light hydrocarbon stream 245 exits the second separator 240 via a second outlet, whereupon it is conveyed to a third separator 250 that is operable to utilize a separation technology, (such as, but not limited to) pressure swing adsorption (PSA) technology or membrane technology to separates the light hydrocarbon stream 245 to produce a hydrogen stream 252 and a light hydrocarbons stream 255. The light hydrocarbons recycle stream 255 predominantly comprises ethylene and ethane, but also may include some residual olefins and alkanes comprising three or four carbon atoms that were not converted to larger hydrocarbons in the oligomerization reactor 228. Light hydrocarbons recycle stream 255 is recycled and combined with the light alkane stream 212.

Speaking generally, the oligomerization catalyst used in the oligomerization reactor of the process and system is one embodiment of the modified ZSM-5 catalyst produced by the methods described herein. The catalytic oligomerization reactor generally includes a fixed bed of the modified ZSM-5 catalyst described herein, which contacts the raw ethylene stream and catalytically converts the raw ethylene stream into a mixture of hydrocarbon products, predominantly comprising product hydrocarbons that collectively form an oligomerization effluent that is conveyed via an outlet conduit to a separator and separated to produce at least three streams or cuts. A bottom cut comprising C4 to C15 hydrocarbons is characterized by a road octane number of about 88 and generally meets specifications for blending into current liquid transportation fuels such as gasoline and perhaps diesel or jet fuel.

The operating conditions of temperature and pressure are maintained in the oligomerization reactor that facilitate the oligomerization of ethylene and propylene to form larger hydrocarbon products that preferably comprise at least five carbon atoms (optionally, at least 7 carbon atoms). Generally speaking, the contacting of the light olefin stream with the oligomerization catalyst occurs at a temperature in the range from 100° C. and 450° C.; optionally, in the range from 225° C. to 400° C.; optionally, in the range from 250° C. to 350° C. Generally speaking, the contacting of the light olefin stream with the oligomerization catalyst occurs at a pressure in the range from 0 psig to 300 psig In certain embodiments, the operating conditions for the oligomerization reactor 150 generally include a pressure in a range from 0 psig to 300 psig; optionally at a pressure in the range from 50 psig to 200 psig. Generally, the feed rate to the oligomerization reactor is (measured as a gas hourly space velocity) in a range from 0.5 hrs$^{-1}$ to 5 hrs$^{-1}$. While higher overall productivity is desirable, typically at least 85% of the ethylene present in the light olefins stream is converted in the oligomerization reactor. Typically, about 98% of the ethylene is converted and over 75% of the products from the ethylene are C5 or larger hydrocarbons (Table 1).

The process to produce the inventive modified catalyst utilizes a sodium-form ZSM-5 powder (NaZSM-5) that has been calcined to remove template. The zeolite NaZSM-5 powder is unsupported and not in a final extrudate form with any type of binder material (e.g., bentonite, alumina, etc.).

FIG. 1 is a simplified flow diagram that illustrates an embodiment to produce a modified HZSM-5 catalyst. Initial synthesis of the catalyst begins with gel formation comprising mixing a silicon source, an aluminum source, and a ZSM-5 zeolite template. Crystallization of the zeolite structure proceeds in a conventional manner that is well-understood by those having skill in the art (and will therefore not be discussed here in greater detail). Following crystallization, the zeolite is rinsed and collected on a filter as a NaZSM-5 filter cake (containing template). A subsequent calcination step at a temperature of at least 500° C. is performed to degrade/remove the template, yielding a sodium form of the ZSM-5 zeolite (NaZSM-5 powder) that is for the most part catalytically-inert for solid-acid-catalyzed reactions.

In the embodiment depicted in FIG. 1, the NaZSM-5 powder is contacted with an aqueous alkaline solution characterized by a pH of at least 11 for a time period of at least 30 min to produce a modified NaZSM-5 zeolite. In some embodiments, the alkaline solution comprises sodium hydroxide at a concentration in the range from 50 mM to 200 mM, alternatively a concentration in the range from 80 mM to 150 mM, alternatively in a range from 80 mM to 120 mM. The time period for contacting with an alkaline solution alternatively may be at least 1 hr; alternatively, a time in the range from 1 hr to 3 hr. The aqueous alkaline solution may be maintained as a temperature in the range from 1° C. to 100° C., alternatively, in the range from 20° C. to 80° C., alternatively in the range from 25° C. to 45° C.

The modified NaZSM-5 zeolite is subjected to ion-exchange by contacting it with a mildly acidic solution to convert the sodium form of the zeolite to the hydrogen form of the ZSM-5 zeolite, producing a modified HZSM-5 zeolite. In certain embodiments, the mildly acidic solution comprises an aqueous solution characterized by a pH value in the range from 1.0 to 6.5. In certain embodiments, the mildly acidic solution comprises an aqueous solution containing at least one of hydrochloric acid and ammonium nitrate. The molarity of the mildly acidic solution may range from 0.05M to 1M for hydrogen chloride and 0.5M to 2.0 M for ammonium nitrate. The mildly acidic solution may be maintained at a temperature in the range from 1° C. to 100° C., alternatively at a temperature in the range from 20° C. to 90° C., alternatively at a temperature in the range from 40° C. to 85° C. The ion-exchange with the mildly acidic solution may be performed for a period ranging from 30 min to 4 hr and may be repeated multiple times to assure that nearly all Na$^+$ ion present on the modified NaZSM-5 zeolite has been exchanged for H+. Following ion-exchange, the Brönsted acid sites on the modified HZSM-5 zeolite are catalytically active for many solid-acid-catalyzed reactions, such as the oligomerization of light olefins. The ion-exchanged modified HZSM-5 zeolite is then collected as a filter cake and rinsed with water to remove the mildly acidic solution. The filter cake is then dried and then calcined to produce a modified HZSM-5 powder. Drying may be conducted at any temperature, although is generally conducted at a temperature above 100° C. Calcining is generally conducted at a temperature above 400° C.; alternatively, at a temperature of at least 500° C. The modified HZSM-5 powder is then combined with a binder (or support) material to produce a catalyst extrudate termed a modified HZSM-5 catalyst. The binder may comprise any known binder or support material. In certain embodiments, the binder surprises at least one of bentonite and alumina. The binder may be combined with the catalyst in a ratio from 1:20 to 20:1 (catalyst to binder) to produce the catalyst extrudate.

The following examples of certain embodiments of the invention are given. Each example is intended to illustrate a specific embodiment, but the scope of the invention is not intended to be limited to the embodiments specifically disclosed. Rather, the scope is intended to be as broad as is supported by the appending claims in view of the full specification.

Example 1

Catalytic performance for light olefin oligomerization was assessed for modified ZSM-5 catalysts produced by the methods described herein. Catalyst performance was assessed over time in order to compared relative catalyst resistance to coking as well as selectivity of the conversion toward condensable products containing five or more carbon atoms (C5+). As shown in FIG. 1, under the conditions utilized all catalysts initially converted 100 vol % of ethylene in the feed gas. As the time on stream (TOS) progressed, the ethylene conversion decreased gradually due to catalyst deactivation as coke accumulated on the catalyst. Catalysts remained on stream until analysis of the products showed that conversion of ethylene in the feed gas fell to 90 vol % or below.

Oligomerization Catalytic Test Samples:
1. HZSM-5 powder in hydrogen form (unmodified): Dried, calcined and mixed with bentonite binder.
2. Modified NaZSM-5 powder: NaZSM-5 powder was treated with 80 mM NaOH solution for 3 h at 25° C. followed by an ion-exchange step with a mildly acidic solution. Dried, calcined and mixed with bentonite binder.
3. Modified HZSM-5 extrudate: HZSM-5 in alumina extrudate form (70 wt % zeolite, 30 wt % alumina) that had been treated with 200 mM NaOH solution for 3 h at 25° C. followed by a 4M HCl acid treatment.

Specified samples were treated with an NaOH solution at the specific concentration of 80 mM at 25° C. for 3 h followed by an ion-exchange step, rinsing with water, collection of the filtrate, drying and calcining at a temperature of at least 500° C. The ion-exchange step was performed by using 1.0 M NH4NO3 solution at 80° C. for 1 h, and the procedure was repeated twice (a total of 3×) to ensure complete conversion of the sodium form of ZSM-5 (NaZSM-5) to the hydrogen form of ZSM-5 (HZSM-5).

For evaluation of the catalytic activity of catalysts modified by the various treatments, each modified catalyst was embedded into bentonite binder to form extrudates prior to the catalytic performance tests. Bentonite was selected as the binder to allow testing of the finished HZSM-5 mixed with binder in a catalytic reactor. Each catalyst extrudate was then tested in a fixed bed in a laboratory reactor.

An evaluation of the performance of the modified catalysts was conducted in a fixed-bed laboratory-scale reactor unit. A 314-stainless steel reactor loaded with 5.0 g of a single test catalyst was placed in a vertical clamshell furnace equipped with a temperature controller. The catalytic reaction was conducted at 318° C., 50 psig, and a space velocity of 1.0 hr$^{-1}$ for a light olefin feed comprising 33 vol % ethylene, 37 vol % hydrogen, 23 vol % nitrogen, and 7 vol % water (as steam). The reactor pressure was controlled using a back-pressure controller. The reactor effluent was chilled in a condenser to recover C5+ liquid hydrocarbon products, and the off-gas from the condenser was analyzed by using an on-line Wasson-ECE Instrumentation refinery gas analyzer. For each run, the daily mass balance was calculated. When ethylene conversion fell below 90 vol %, the reaction run was terminated. The longer a given catalyst remained on-stream before the conversion of ethylene fell below 90 vol %, the more resistant the catalyst was deemed to be to the formation of deactivating coke in its pores and/or mesopores.

Figure 3:
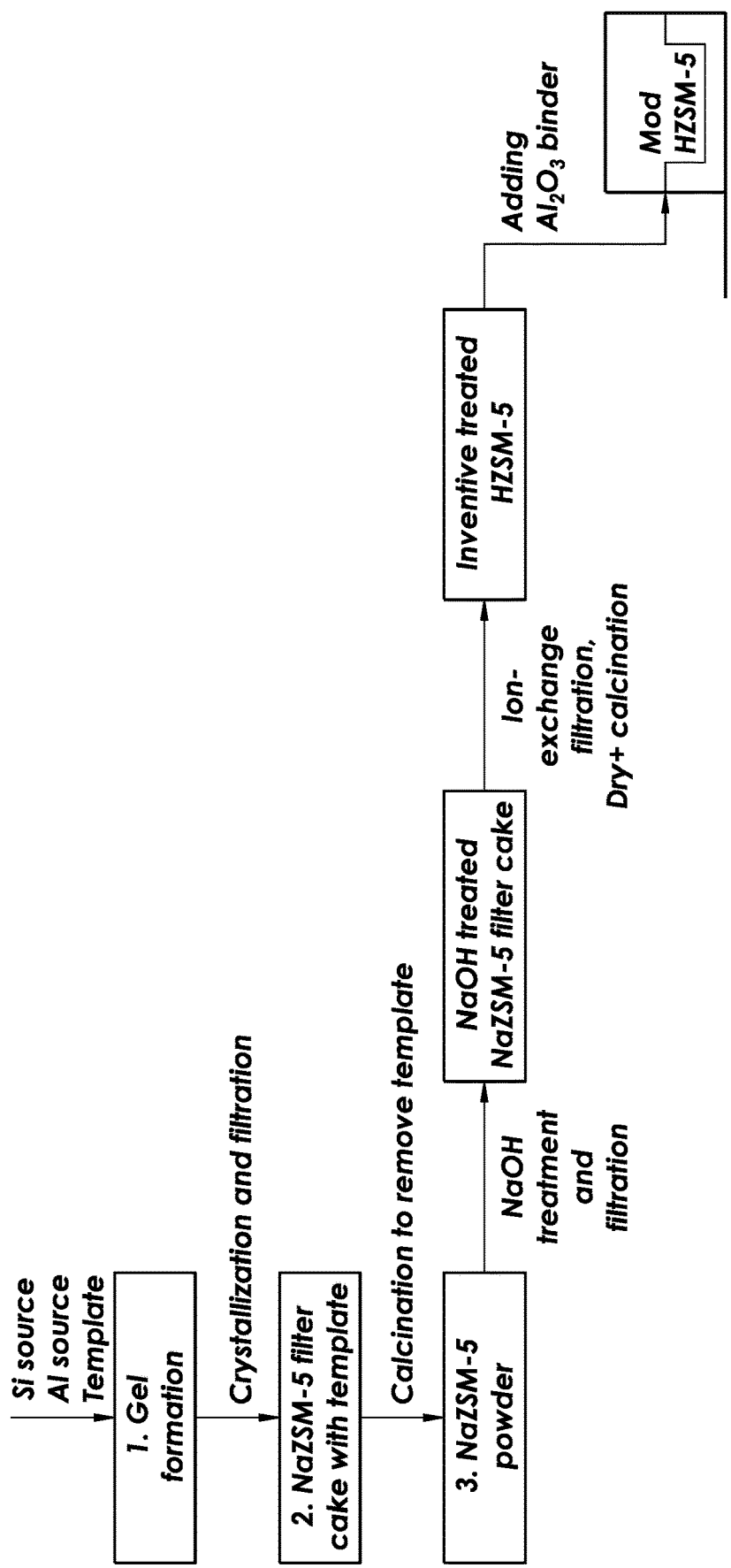
FIG. 3 is a flow diagram illustrating an embodiment of the process for making the modified catalyst.

FIG. 3 is a flow diagram illustrating an embodiment of the process for making the modified catalyst.

Figure 4:
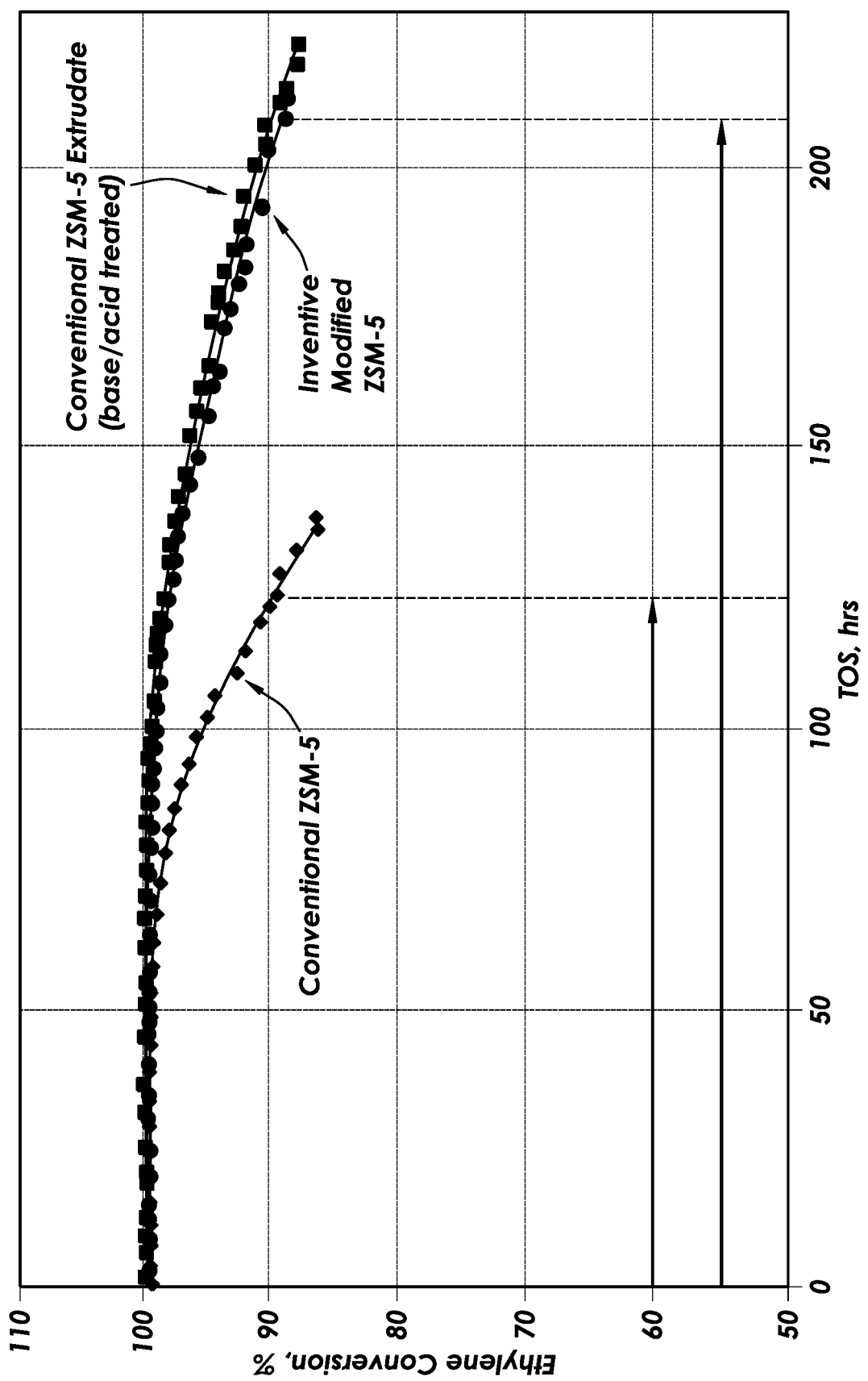
FIG. 4 is a chart showing improved resistance to coking of the modified catalyst.

FIG. 4 shows the ethylene conversion versus time-on-stream (TOS) for the three test samples described above: 1) Untreated HZSM-5 catalyst; 2) Inventive modified NaZSM-5 powder (in extrudate form); 3) Post-treated ZSM-5 catalyst extrudate; The results showed that the conventional HZSM-5 catalyst had a TOS of only about 120 hours before the ethylene conversion fell below 90% was, and this was improved to 210 hours (approximate 75% increase) by treating either the NaZSM-5 powder with sodium hydroxide or the HZSM-5 extrudates with HCl acid and sodium hydroxide. Notably, the modified catalysts produced by the inventive methods disclosed herein had a comparable TOS90 to a modified HZSM-5 catalyst extrudate prepared according to the methods outlined in U.S. Pat. No. 10,214,426 (treatment of a ZSM-5 catalyst extrudate comprising 30 wt. % alumina binder with 200 mM NaOH, then 4M HCL in series). The present inventive method produced a modified catalyst that was produced with fewer manufacturing steps and with less time invested, while the resulting modified catalyst had a resistance to coking equivalent to conventional modified catalyst extrudates that had been contacted with alkaline solution and/or acidic solution. In addition, the present inventive catalyst had improved mechanical strength relative to conventional modified catalyst extrudates contacted with alkaline solution and/or acidic solution, which is demonstrated in greater detail below.

Example 2

To assess the dependence of coking resistance to the concentration of sodium hydroxide (NaOH) during the contacting, NaHZSM-5 powder samples were contacted with various concentrations of aqueous NaOH solution at concentrations that ranged from 10 mM to 540 mM at 25° C. for 3 h. The contacting was followed by an ion-exchange step, rinsing of the catalyst with water, collection of the filtrate, drying and calcining of the modified catalyst at a temperature of 550° C. The ion-exchange step was performed by using 1.0 M NH4NO3 solution at 80° C. for 1 h, and the procedure was repeated twice (a total of 3×) to ensure complete conversion of the sodium form of ZSM-5 (NaZSM-5) to the hydrogen form of ZSM-5 (HZSM-5). For evaluation of the catalytic activity of catalysts modified by the various treatments, each modified catalyst was embedded into bentonite binder to form extrudates prior to the catalytic performance tests. Bentonite was selected as the binder to allow testing of the finished HZSM-5 mixed with binder in a catalytic reactor. Each catalyst extrudate was then tested in a fixed bed in a laboratory reactor.

Figure 5:
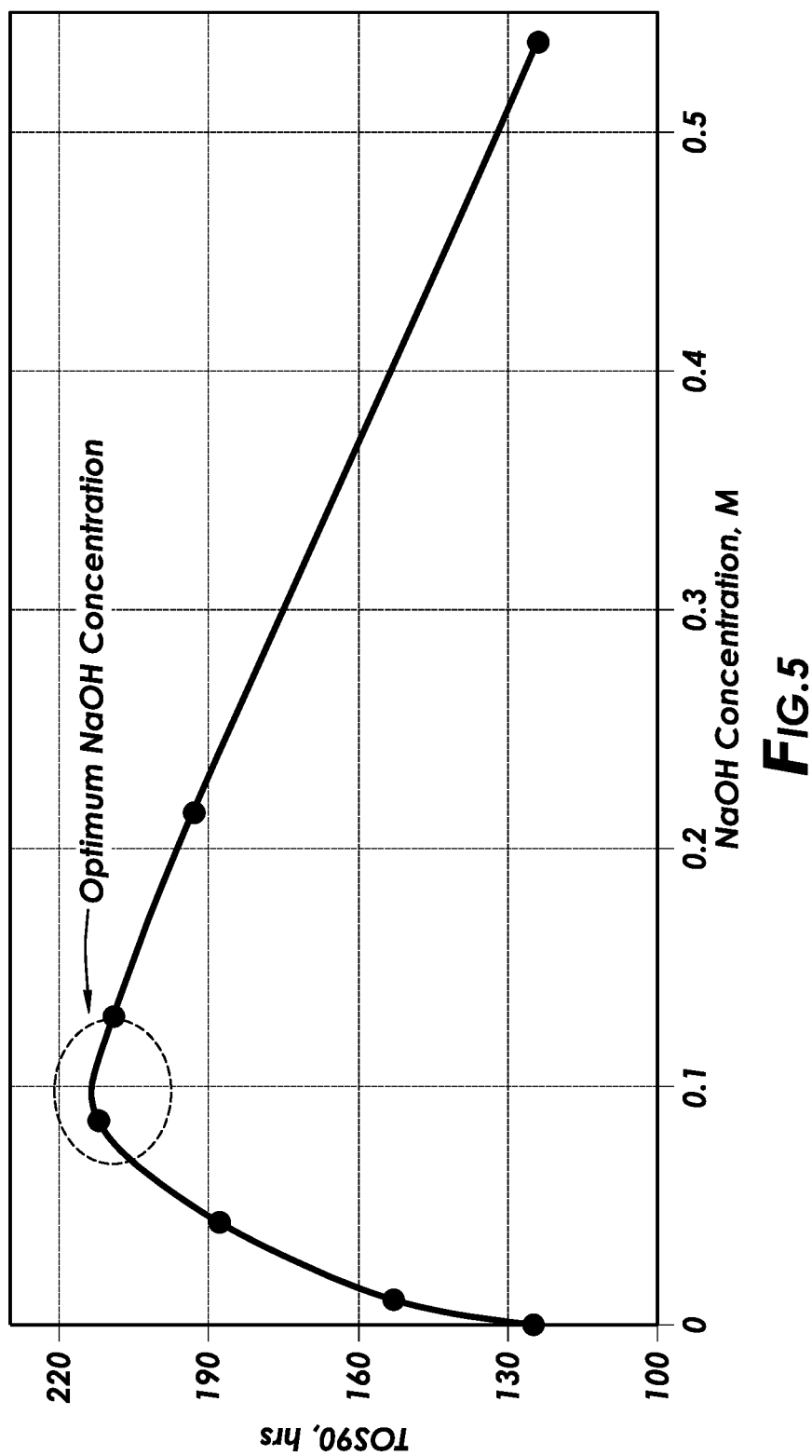
FIG. 5 is a chart showing correlation between sodium hydroxide concentration (during contacting with the catalyst) and the modified catalyst's resistance to coking.

An evaluation of the performance of the modified catalysts was conducted in a fixed-bed laboratory-scale reactor unit in an identical manner to the evaluation shown in Example 1 (above). FIG. 5 shows the sodium hydroxide (NaOH) treatment concentration (in M) versus time-on-stream until conversion efficiency dropped to 90% (TOS90) for the test samples described above. The results showed a distinct correlation between NaOH concentration and increased resistance to coking of the catalyst (increased time on-stream prior to reaching TOS90). Untreated HZSM-5 catalyst in bentonite extrudate form had a TOS90 of only about 120 hours, which improved to as much as 210 hours (approximate 75% increase) by contacting the NaZSM-5 powder with 0.1 M NaOH for 3 hr.

Example 3

We compared the mechanical strength/crush resistance of a catalyst prepared according to the methods disclosed herein with the mechanical strength/crush resistance of a modified HZSM-5 catalyst prepared according to the methods outlined in US Ser. No. 10,207,962 (in which a zeolite catalyst powder bound to an alumina support was treated with basic and/or acidic solution in order to improve resistance of the catalyst to coking).

Compressive force was applied to multiple samples of 1) a H-ZSM-5 catalyst extrudate modified according to the processes described in U.S. Pat. No. 10,207,962 (post-modified HZSM-5), and 2) an HZSM-5 catalyst prepared according to the procedures disclosed herein.

An IMADA digital force gauge was utilized to measure the compressive force that was needed to crush each sample. The force required to crush the inventive catalyst samples was approximately twice the force needed to crush the catalyst samples prepared according of the prior method of U.S. Pat. No. 10,207,962. It was therefore concluded that the inventive catalysts had significantly improved mechanical strength and/or crush resistance.

We believe that this increased mechanical strength correlates to the present inventive method preventing the loss of alumina binder during the contacting of an HZSM-5 catalyst extrudate with alkaline and acidic solutions. The present inventive methods modify a ZSM-5 zeolite that is unsupported (i.e., has not been combined with a binder material to form an extrudate) and is not the final catalyst extrudate that would be typically utilized in a commercial setting. According to the methods disclosed herein, a ZSM-5 zeolite is modified by contacting with an alkaline solution prior to combining the modified zeolite with a binder material (for example, but not limited to, bentonite, silica or alumina) to produce a catalyst extrudate.

Example 4

We assessed whether the inventive treatment produced a modified catalyst characterized by an altered selectivity toward the conversion of the ethylene feed stream to various hydrocarbon products. As in Example 1 (above), NaZSM-5 powder was treated with 80 mM NaOH solution for 3 h at 25° C. followed by an ion-exchange step with a mildly acidic solution. Dried, calcined and mixed with bentonite binder. The produced modified catalyst was tested alongside an untreated HZSM-5 catalyst (as in Example 1) in a fixed-bed laboratory-scale reactor unit. A 314-stainless steel reactor loaded with 5.0 g of a single test catalyst was placed in a vertical clamshell furnace equipped with a temperature controller. The catalytic reaction was conducted at 318° C., 50 psig, and a space velocity of 1.0 hr$^{-1}$ for a light olefin feed comprising 33 vol % ethylene, 37 vol % hydrogen, 23 vol % nitrogen, and 7 vol % water (as steam). The reactor pressure was controlled using a back-pressure controller. The reactor effluent was chilled in a condenser to recover C5+ liquid hydrocarbon products, and the off-gas from the condenser was analyzed by using an on-line Wasson-ECE Instrumentation refinery gas analyzer.

The product selectivity of the catalyst modified by treatment with 80 mM NaOH appeared indistinguishable from the product selectivity of the untreated control, as is shown in Table 1 below.

TABLE 1

Product Distribution of Both an Untreated HZSM-5 and a Modified HZSM-5 (treated with 80 mM NaOH).

| Product distribution | Conventional ZSM-5 | Modified ZSM-5 80 mM NaOH |
|---|---|---|
| C1-C2 paraffins | 1.8 | 0.8 |
| C3-C4 paraffins | 13.8 | 13.9 |
| C3-C4 olefins | 8.2 | 10.1 |
| C5+ | 76.2 | 75.2 |
| Total | 100.0 | 100.0 |

This confirmed that the inventive treatment to produce a modified catalyst that is resistant to coking (and that as a consequence has a longer catalytic lifespan) did not detrimentally affect the product profile, in particular, the percentage of the feed that is converted in to hydrocarbons containing five or more carbon atoms (C5+) that may be useful as a liquid transportation fuel or a blend component thereof.

Definitions

In the present disclosure, the term "unsupported catalyst" is defined as a catalyst that has not been combined with any solid binder material (such as, but not limited to, alumina, bentonite, boehmite and silica and colloidal silica) to produce a final extrudate that is suitable for commercial use.

In the present disclosure, the term "catalytic activation" is defined as a chemical reaction facilitated by a catalyst that forms an activated hydrocarbyl intermediate from a C—H bond. The hydrocarbyl intermediate can then be functionalized to produce either an olefin or a larger hydrocarbon product via a mechanism that may include at least one of dehydrogenation, olefination, arylation, alkylation, dimerization, oligomerization, isomerization and aromatization.

In the present disclosure, pores within the catalyst molecular framework are defined consistent with the IUPAC definition, with macropores defined as >50 nm in diameter, mesopores ranging from 2-50 nm in diameter and micropores less than 2 nm in diameter.

I claim:

1. A modified HZSM-5 catalyst produced by:
    a) contacting an NaZSM-5 zeolite that is free of binder material and template with an alkaline solution characterized by a pH of at least 11 for at least 1 hr to produce a modified NaZSM 5 zeolite;
    b) diluting the alkaline solution with water, then performing ion-exchange on the modified NaZSM-5 zeolite by contacting the modified NaZSM-5 zeolite with an acidic solution characterized by a pH in the range from 1.0 to 6.5 to convert the modified NaZSM-5 zeolite to a modified HZSM-5 catalyst intermediate;
    c) drying the modified HZSM-5 catalyst intermediate to produce a dried HZSM-5 catalyst intermediate;
    d) calcining the dried HZSM-5 catalyst intermediate to produce a modified HZSM-5 catalyst, wherein the modified HZSM-5 catalyst comprises an increased mesopore volume relative to an untreated HZSM-5 catalyst, wherein mesopores within the catalyst are defined as pores in the range from 2 to 50 nm in diameter.

2. The modified HZSM-5 catalyst of claim 1, wherein the modified HZSM-5 catalyst is in the form of an extrudate, and wherein the process for producing the modified HZSM-5 catalyst further comprises forming a mixture of the modified HZSM-5 catalyst produced in step d) with at least one binder material to produce a modified HZSM-5 catalyst extrudate that is characterized by an increase in at least one of crush resistance, attrition resistance and mechanical strength relative to an HZSM-5 catalyst extrudate comprising the same binder material that has been contacted with an acidic solution comprising hydrogen chloride at a concentration of at least 4 M for at least 4 hours.

3. The catalyst of claim 1, wherein the alkaline solution of the method is a sodium hydroxide solution at a concentration in the range from 1 mM to 200 mM.

4. The catalyst of claim 1, wherein the alkaline solution of the method is an aqueous sodium hydroxide solution at a concentration in the range from 50 mM to 150 mM and the contacting of a) occurs for at least 3 hrs.

5. The catalyst of claim 1, wherein the alkaline solution of the method is maintained at a temperature in the range from 25° C. to 50° C. during the contacting of part a).

6. The catalyst of claim 1, wherein the acidic solution of the method comprises an aqueous ammonium nitrate solution at a concentration in the range from 100 mM to 5 M.

7. The catalyst of claim 1, wherein the acidic solution of the method is maintained at a temperature of 80° C., and the ion-exchange is performed for at least 1 hr.

8. The method of claim 1, wherein the drying of the method occurs at a temperature of at least 100° C. and the calcining occurs at a temperature of at least 500° C.

9. The catalyst of claim 1, wherein the NaZSM-5 zeolite of step a) has been calcined at a temperature of at least 500° C.

10. A method for producing a modified ZSM-5 catalyst, comprising:
   a) contacting an NaZSM-5 zeolite that is free of binder material and template with an alkaline solution characterized by a pH of at least 11 for at least 1 hr to produce a modified NaZSM-5 zeolite;
   b) diluting the alkaline solution with water, then performing ion-exchange on the modified NaZSM-5 zeolite by contacting the modified NaZSM-5 zeolite with an acidic solution characterized by a pH in the range from 1.0 to 6.5 to convert the modified NaZSM-5 zeolite to a modified HZSM-5 catalyst intermediate;
   c) drying the modified HZSM-5 catalyst intermediate to produce a dried HZSM-5 catalyst intermediate;
   d) calcining the dried HZSM-5 catalyst intermediate to produce a modified HZSM-5 catalyst.

11. The method of claim 10, further comprising combining the modified HZSM-5 catalyst with at least one binder material to produce a modified HZSM-5 catalyst extrudate.

12. The method of claim 10, wherein the alkaline solution comprises a sodium hydroxide solution at a concentration in the range from 20 mM to 200 mM.

13. The method of claim 10, wherein the alkaline solution comprises an aqueous sodium hydroxide solution at a concentration in the range from 50 mM to 150 mM.

14. The method of claim 10, wherein the alkaline solution is maintained at a temperature of at least 35 deg F. during the contacting of part a).

15. The method of claim 10, wherein the acidic solution is maintained at a temperature of at least 50 deg F. and the ion-exchange is performed for at least 1 hr.

16. The method of claim 10, wherein the acidic solution comprises an aqueous ammonium nitrate solution at a concentration in the range from 100 mM to 5 M.

17. The method of claim 10, wherein the drying occurs at a temperature of at least 100° C. and the calcining occurs at a temperature of at least 500° C.

18. The method of claim 10, further comprising forming a mixture of the modified HZSM-5 catalyst produced in step d) with at least one binder material to produce a modified HZSM-5 catalyst extrudate.

19. A modified HZSM-5 catalyst produced by:
   a) contacting an NaZSM-5 zeolite that is free of binder material and template with an alkaline solution characterized by a pH of at least 11 for at least 1 hr to produce a modified NaZSM-5 zeolite;
   b) diluting the alkaline solution with water, then performing ion-exchange on the modified NaZSM-5 zeolite by contacting the modified NaZSM-5 zeolite with an acidic solution characterized by a pH in the range from 1.0 to 6.5 to convert the modified NaZSM-5 zeolite to a modified HZSM-5 catalyst intermediate;
   c) drying the modified HZSM-5 catalyst intermediate to produce a dried HZSM-5 catalyst intermediate;
   d) calcining the dried HZSM-5 catalyst intermediate to produce a modified HZSM-5 catalyst, wherein the modified HZSM-5 catalyst comprises an increased mesopore volume relative to an untreated HZSM-5 catalyst, wherein mesopores within the catalyst are defined as pores in the range from 2 to 50 nm in diameter; and
   e) forming a mixture of the modified HZSM-5 catalyst produced in step d) with at least one binder material to produce a modified HZSM-5 catalyst extrudate.

20. A method for converting ethylene to larger hydrocarbons, comprising:
   a) providing a modified HZSM-5 catalyst extrudate according to claim 19;
   b) contacting a feed stream comprising ethylene with the modified HZSM-5 catalyst extrudate at a pressure between 0 psig and 800 psig, a temperature in the range from 260° C. to 420° C., and a gas hourly space velocity of between 1000 and 5000 inverse hours to convert at least 85% of the ethylene to products that are characterized as blend stock for a liquid transportation fuel.

21. The method of claim 20, wherein the feed stream comprises a light olefin feed stream predominantly comprising olefins containing 2-3 carbon atoms and alkanes containing 2-3 carbon atoms.

22. The method of claim 20, wherein the feed stream is derived from the cracking of light alkanes containing from two to seven carbon atoms, wherein the cracking is selected from thermal cracking and catalytic cracking.

23. The method of claim 20, additionally comprising hydrotreating the products of b) to produce the blend stock for a liquid transportation fuel.

24. A modified HZSM-5 catalyst produced according to the method of claim 17, wherein the modified HZSM-5 catalyst comprises an increased mesopore volume relative to an untreated HZSM-5 catalyst, wherein mesopores within the catalyst are defined as pores in the range from 2 to 50 nm in diameter.

25. The method of claim 20, wherein the modified HZSM-5 catalyst is in the form of an extrudate, and wherein the process for producing the modified HZSM-5 catalyst further comprising forming a mixture of the modified HZSM-5 catalyst produced in step d) with at least one binder material to produce a modified HZSM-5 catalyst extrudate that is characterized by an increase in at least one of crush resistance, attrition resistance and mechanical strength relative to an HZSM-5 catalyst extrudate comprising the same binder material that has been contacted with an acidic solution comprising hydrogen chloride at a concentration of at least 4 M for at least 4 hours.

26. The method of claim 20, wherein the alkaline solution is a sodium hydroxide solution at a concentration in the range from 1 mM to 200 mM.

27. The method of claim 20, wherein the alkaline solution is an aqueous sodium hydroxide solution at a concentration in the range from 50 mM to 150 mM and the contacting of a) occurs for at least 3 hrs.

28. The method of claim 20, wherein the alkaline solution is maintained at a temperature in the range from 25° C. to 50° C. during the contacting of part a).

29. The method of claim 20, wherein the acidic solution comprises an aqueous ammonium nitrate solution at a concentration in the range from 100 mM to 5 M.

30. The method of claim 20, wherein the acidic solution of is maintained at a temperature of 80° C., and the ion-exchange is performed for at least 1 hr.

31. The method of claim 20, wherein the drying of the method occurs at a temperature of at least 100° C. and the calcining occurs at a temperature of at least 500° C.

* * * * *